United States Patent
Weng et al.

(10) Patent No.: US 10,208,732 B2
(45) Date of Patent: Feb. 19, 2019

(54) INTELLIGENT WIND TURBINE GENERATOR

(71) Applicant: CHUNG YUAN CHRISTIAN UNIVERSITY, Taoyuan (TW)

(72) Inventors: Huei-Chu Weng, Taoyuan (TW); Chen-Ming Fan, Taoyuan (TW); Hung-Yu Chen, Taoyuan (TW); Kevin Buana, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 731 days.

(21) Appl. No.: 14/856,188

(22) Filed: Sep. 16, 2015

(65) Prior Publication Data

US 2016/0298601 A1    Oct. 13, 2016

(30) Foreign Application Priority Data

Apr. 13, 2015 (TW) .................. 104111847

(51) Int. Cl.
*F03D 7/02* (2006.01)
*F03D 1/02* (2006.01)
(Continued)

(52) U.S. Cl.
CPC ............ *F03D 1/025* (2013.01); *F03D 1/065* (2013.01); *F03D 7/02* (2013.01); *F03D 9/25* (2016.05);
(Continued)

(58) Field of Classification Search
CPC . F03D 1/02; F03D 1/025; F03D 1/065; F03D 1/0658; F03D 9/25; F03D 13/10; F03D 15/10; F03D 17/00; F03D 1/0666; F03D 1/0691; F03D 3/02; F03D 3/062; F03D 7/02; F03D 7/022; F03D 7/0236; F05B 2240/313; F05B 2250/311
See application file for complete search history.

(56) References Cited

U.S. PATENT DOCUMENTS

2010/0254812 A1* 10/2010 Reitz ................. F03D 1/025
416/1
2013/0243590 A1* 9/2013 Edenfeld ............. F03D 7/0224
416/1

OTHER PUBLICATIONS

Department of Mechanical Engineering, Chung Yuan Christian University, "Smart Blade Switch for a Wind Turbine", 2013 Teaching Excellence Project, Oct. 17, 2014.

* cited by examiner

*Primary Examiner* — Richard A Edgar
*Assistant Examiner* — Alexander A White
(74) *Attorney, Agent, or Firm* — Rosenberg, Klein & Lee

(57) ABSTRACT

The present invention relates to an intelligent wind turbine generator, which comprises a first blade module, a second blade module, a power generating module, and a control module. The second blade module is disposed at the first blade module. The power generating module is connected with the first and second blade modules. The control module is connected with the power generating module, the first blade module, and the second blade module. The first and second blade modules rotate, driving the power generating module to generate power. The control module detects a voltage value generated by the power generating module and judges if the voltage value is greater or lower than a predetermined value. The control module controls whether the first and second blade modules overlap or not. The intelligent wind turbine generator is able to switch automatically the blade number of the wind turbine generator.

8 Claims, 7 Drawing Sheets

(51) Int. Cl.
  *F03D 17/00*   (2016.01)
  *F03D 15/10*   (2016.01)
  *F03D 13/10*   (2016.01)
  *F03D 9/25*   (2016.01)
  *F03D 1/06*   (2006.01)
(52) U.S. Cl.
  CPC ............ *F03D 13/10* (2016.05); *F03D 15/10* (2016.05); *F03D 17/00* (2016.05); *Y02E 10/721* (2013.01); *Y02E 10/723* (2013.01)

INTELLIGENT WIND TURBINE GENERATOR

FIELD OF THE INVENTION

The present invention relates generally to a wind turbine generator, and particularly to an intelligent wind turbine generator.

BACKGROUND OF THE INVENTION

Technologies advance daily. People need energy in various aspect of living, including food, clothing, residence, and transportation. In particular, many industries consume massive energy for mass production. Accordingly, energy resources are extremely precious to humans. The development of energy resources can be categorized into non-renewable energy resources and renewable energy resources. Non-renewable energy resources, namely, exhaustive energy resources, such as coal, petroleum, natural gas, and uranium, adopt non-reusable energy resources. Unfortunately, they tend to pollute the environment. In addition, energy exhaustion will occur some day. On the contrary, renewable energy resources, namely, non-exhaustive energy resources, such as solar energy, wind energy, hydroelectric energy, and geothermal energy, adopt clean reusable energy resources and no pollution will be incurred.

Due to severe environmental pollution, the global weather becomes abnormal. For the sake of a sustainable earth, the world has started to emphasize the development and utilization of renewable energy resources. The wind energy is a usable energy caused by airflow. As the speed of airflow is faster, the kinetic energy is greater. Conventionally, a windmill is invented for converting the kinetic energy of wind into usable mechanical energy. On the other hand, by using a wind turbine generator, the kinetic energy of wind can be converted into usable electrical energy. The method is roughly to transmit the rotating power of a rotor (the blade module) to the generator via a drive shaft.

The wind turbine generator according to the prior art can be categorized into the three-blade type and the six-blade type. The difference in the number of blades of a wind turbine generator is that the three-blade type can achieve a better conversion effect of wind power in a high wind-speed environment, while the six-type type can achieve a better conversion effect of wind power in a low wind-speed environment. Unfortunately, the wind turbine generator according to the prior art can select either the six-blade type or the three-blade type, instead of selecting both. Consequently, when the three-blade wind turbine generator is selected for power generation, its drawback of inefficient power generation in a low wind-speed environment occurs. Similarly, when the six-blade wind turbine generator is selected for power generation, its drawback of inefficient power generation in a high wind-speed environment occurs, too. Nonetheless, the strength of wind depends on natural variations; it is not possible to control the environment to maintain in a high or low wind-speed condition. Thereby, it is difficult to keep the wind turbine generator in a high-efficiency power generating condition continuously.

Accordingly, how to maintain a wind turbine generator in a high-efficiency power conversion condition in any environment has become a problem to be solved. The present invention hence provides an intelligent wind turbine generator for solving the drawback of the wind turbine generator according to the prior art.

SUMMARY

An objective of the present invention is to provide an intelligent wind turbine generator, which switches automatically to an appropriate blade-number mode by detecting the voltage value generated by the power generating module. Thereby, the blade-number mode of the wind turbine generator can correspond to a high or low wind-speed environment and hence high-efficiency power generation can be maintained in the intelligent wind turbine generator by adopting the appropriate blade-number mode.

In order to achieve the objective and efficacy as described above, the present invention provides an intelligent wind turbine generator, which comprises a first blade module, a second blade module, a power generating module, and a control module. The second blade module is disposed at the first blade module. The power generating module is connected with the first and second blade modules. The control module is connected with the power generating module, the first blade module, and the second blade module. The first and second blade modules rotate, driving the power generating module to generate power. The control module detects a voltage value generated by the power generating module and judges if the voltage value is greater or lower than a predetermined value. The control module controls the first and second blade modules to overlap or not to overlap.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
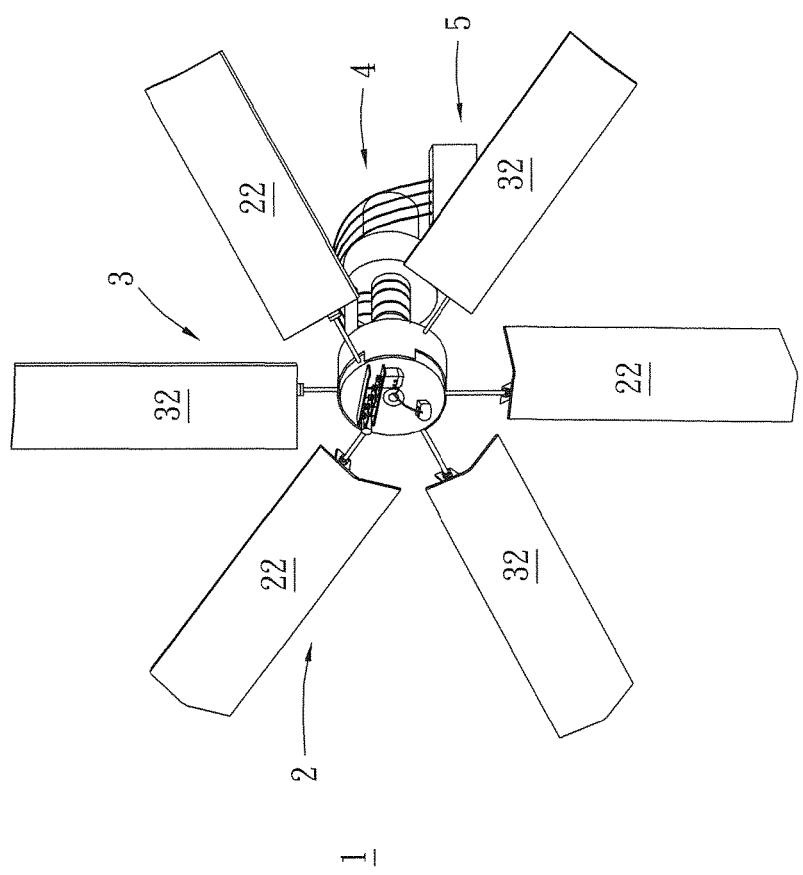
FIG. 1 shows a structural diagram of the intelligent wind power generator according to an embodiment of the present invention.

Please refer to FIG. 1, which shows a structural diagram of the intelligent wind power generator according to an embodiment of the present invention. As shown in the figure, the present embodiment relates to the structure of an intelligent wind turbine generator 1, which changes the number of blades of the wind turbine generator by automatic control so that the number of blades of the wind turbine generator can correspond appropriately to the wind speed. As the intelligent wind turbine generator 1 generates power in a high or low wind-speed environment, preferred wind-power conversion efficiency can be sustained during power generation. The intelligent wind turbine generator 1 is described in the three- and six-blade modes.

Figure 2:
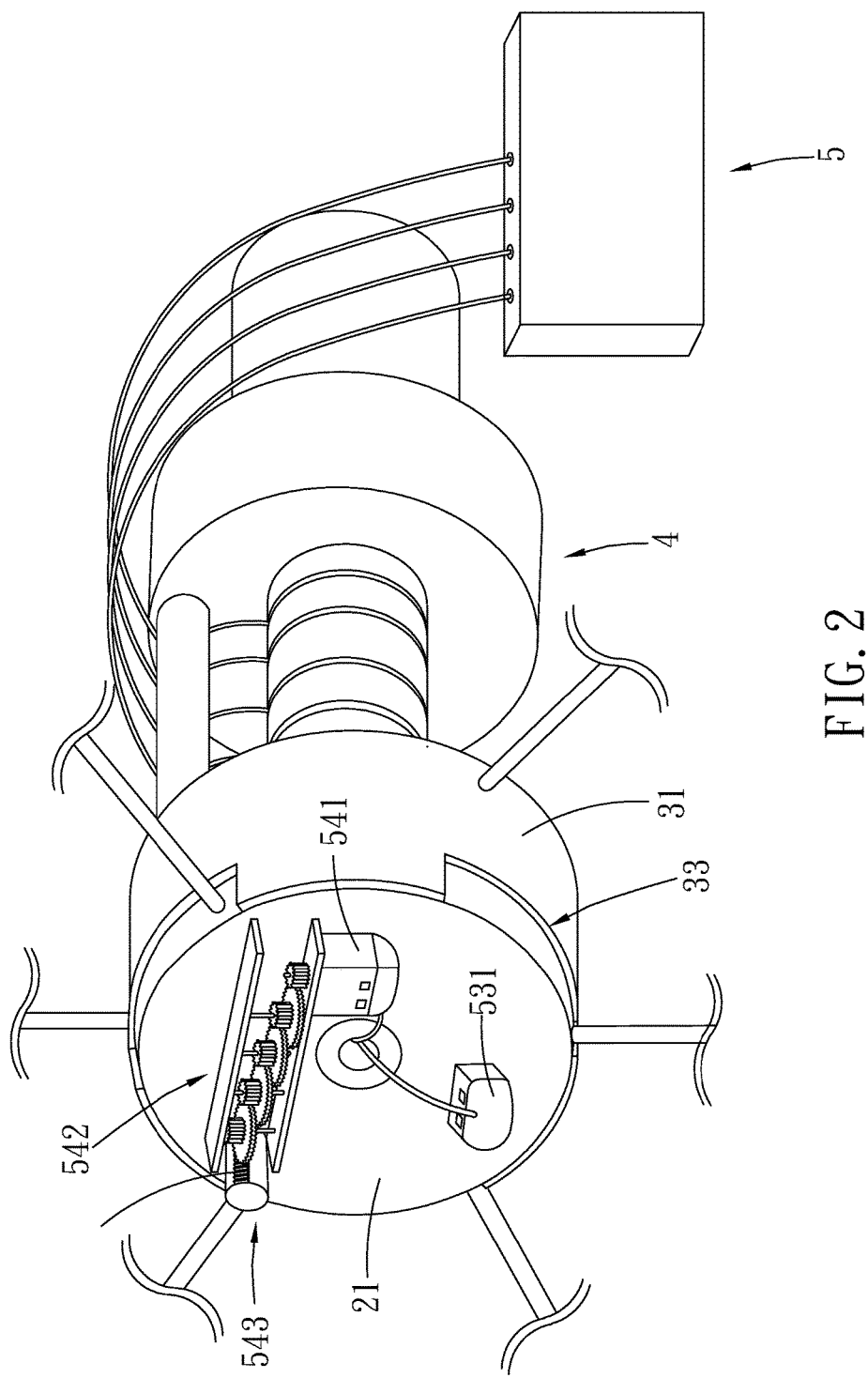
FIG. 2 shows a structural diagram of the power generating module of the intelligent wind power generator according to an embodiment of the present invention.

Please refer to FIG. 2, which shows a structural diagram of the power generating module of the intelligent wind power generator according to an embodiment of the present invention. As shown in the figure, the intelligent wind turbine generator 1 according to the present embodiment comprises a first blade module 2, a second blade module 3, a power generating module 4, and a control module 5. The second blade module 3 is disposed on one side of the first blade module 2. The power generating module 4 is connected with the first and second blade modules 2, 3. The control module 5 is connected electrically with the power generating module 4 as well as with the first and second blade modules 2, 3.

According to the present embodiment, the intelligent wind turbine generator 1 operates to generate power. The first and second blade modules 2, 3 rotate as driven by the wind and thus driving the power generating module 4 to generate power. Concurrently, the control module 5 detects a voltage value generated by the power generating module 4. Then, the control module 5 judges if the voltage value is greater than or lower than a predetermined value for controlling overlapping of the first and second blade modules 2, 3.

Here, the structures of the first and second blade modules 2, 3 are described first. Please refer to FIG. 3, which shows an internal structural diagram of the intelligent wind power generator according to an embodiment of the present invention. As shown in the figure, the first blade module 2 according to the present embodiment comprises a first plate member 21 and a plurality of first blades 22. The plurality of first blades 22 are disposed surrounding the outer periphery of the first plate member 21. Besides, the second blade module 3 comprises a second plate member 31 and a plurality of second blades 32. The plurality of second blade members 32 are disposed surrounding the outer periphery of the second plate member 31.

The second plate member 31 includes an accommodating cavity 311. The outer diameter of the first plate member 21 is smaller than the inner diameter of the accommodating cavity 311 of the second plate member 31. The first plate member 21 is inlaid in the accommodating cavity 311 of the second plate member 31 and located on one side of the second plate member 31. The sidewall of the second plate member 31 includes a plurality of notches 33. The plurality of first blades 22 are located in the plurality of notches 33. Each notch 33 has a span width D. As the first plate member 21 rotates with respect to the second plate member 31, the plurality of first blades 22 move inside the plurality of notches 33. In addition, the plurality of second blades 32 are disposed at the second plate member 31 corresponding to the plurality of notches 33. The plurality of first blades 22 are parallel with the plurality of second blades 32; they are not arranged on the same plane. When the first plate member 21 rotates with respect to the second plate member 31, the plurality of first blades 22 move inside the plurality of notches 33 along with the first plate member 21. Moreover, the plurality of first blades 22 selectively overlap or do not overlap the plurality of second blades 32.

Furthermore, according to the present embodiment, an axis unit 42 passes through the centers of the first and second plate members 21, 31. The first plate member 21 is pivoted on the axis unit 42, while the second plate member 31 is fixed at the axis unit 42. The first plate member 21 can rotate with respect to the axis unit 42. The first plate member 21 includes a ball bearing 43 corresponding to the axis unit 42. The ball bearing 43 can reduce the fraction with the axis unit 42 and thus facilitating rotation of the plurality of first blades 22 and enabling overlapping or nonoverlapping of the plurality of first blades 22 on the plurality of second blades 32.

Figure 4:
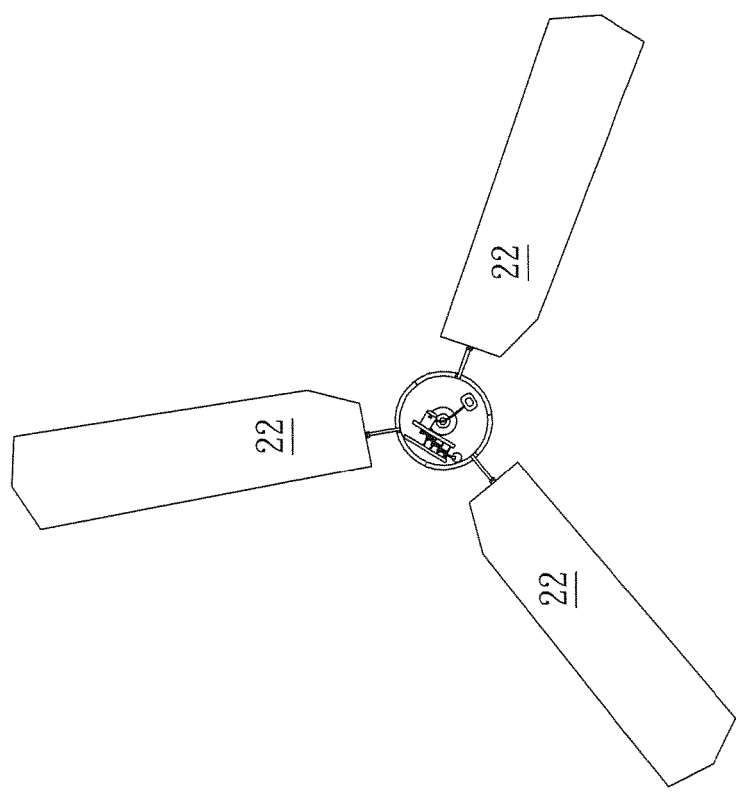
FIG. 4 shows a usage status diagram of the intelligent wind power generator according to an embodiment of the present invention.
Figure 5:
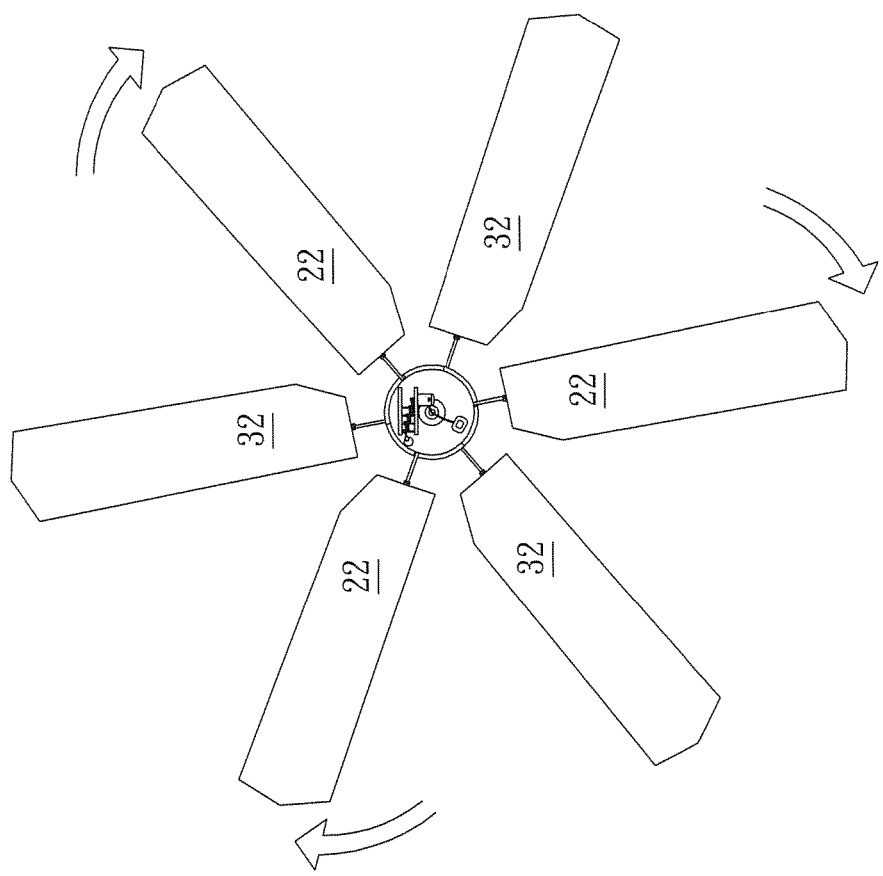
FIG. 5 shows another usage status diagram of the intelligent wind power generator according to an embodiment of the present invention.

Please refer to FIG. 4 and FIG. 5, which show a usage status diagram and another usage status diagram of the intelligent wind power generator according to an embodiment of the present invention. As shown in the figures, the first blade module 2 and the second blade module 3 according to the present embodiment include three first blades 22 and three second blades 32, respectively. The angle between any two of the plurality of first blades 22 and the angle between any two of the plurality of second blades 32 are 120 degrees. As the plurality of first blades 22 overlap the plurality of second blades 32, a wind turbine generator in the three-blade mode is formed, as shown in FIG. 4. On the contrary, when the plurality of first blades 32 do not overlap the plurality of second blades 32, each the plurality of second blades 32 is located between two first blades 22 for forming a wind turbine generator in the six-blade mode, as shown in FIG. 5. The angle between each first blade 22 and the adjacent second blade 32 is 60 degrees, which means that the span width D of the plurality of notches 33 is the arc length of a 60-degree central angle. Hence, the range of movement of the plurality of first blades 22 is limited.

Figure 6:
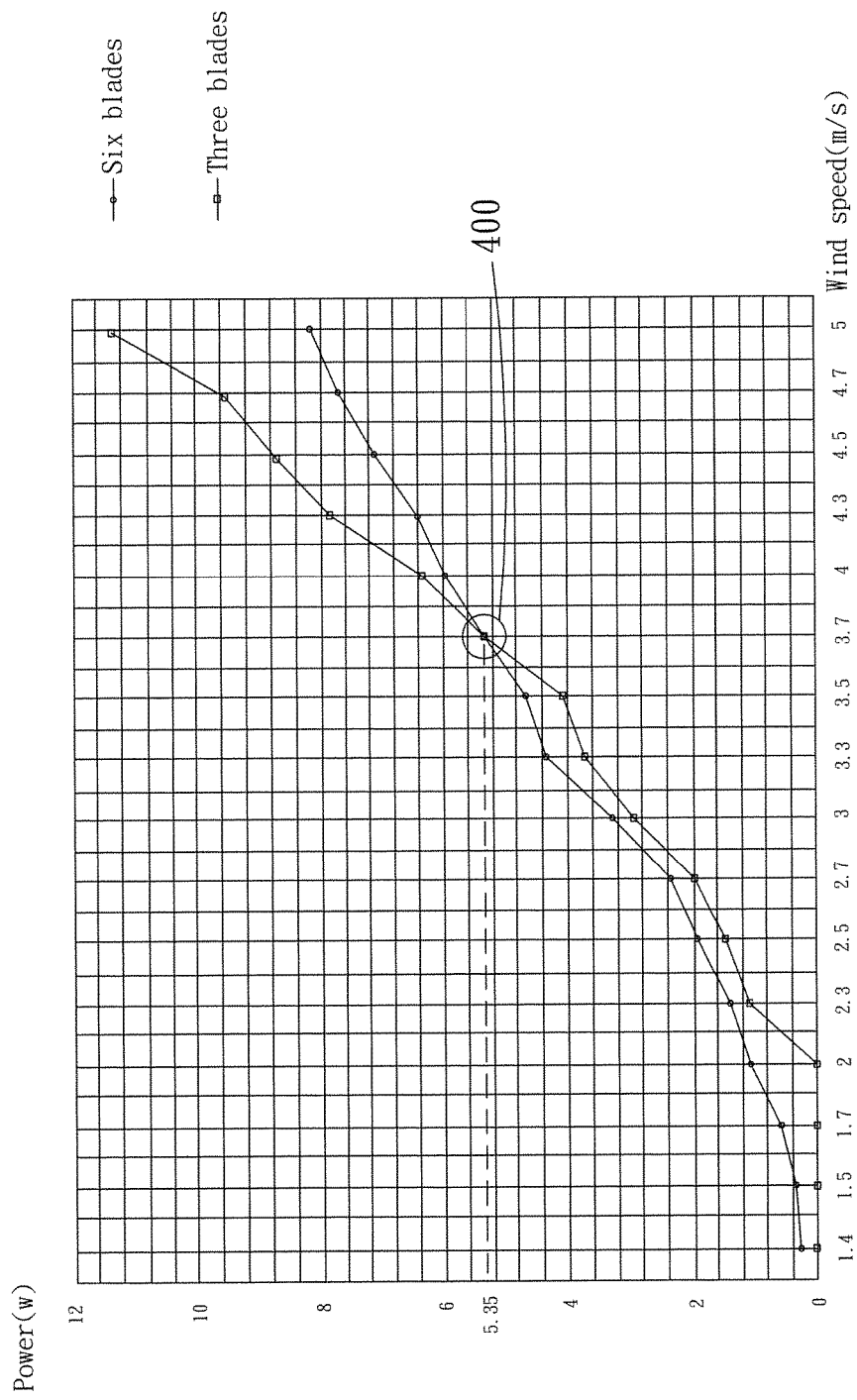
FIG. 6 shows a power diagram of the intelligent wind power generator according to an embodiment of the present invention.

Please refer to FIG. 6, which shows a power diagram of the intelligent wind power generator according to an embodiment of the present invention. As shown in the figure and as described above, whether the plurality of first blades 22 of the first blade module 2 and the plurality of second blades of the second blade module 3 overlap is controlled by the control module 5. The control module 5 judges the wind speed of the current environment according to the voltage value generated by the power generating module 4 for controlling the wind turbine generator to be in the three- or six-blade mode. According to the present embodiment, the voltage value of the power generating module 4 changes as the wind speed of the environment varies. In the line chart shown in FIG. 3, the x-axis is the wind speed in m/s and the y-axis is power in W. This figure depicts the difference between a wind turbine generator in the six-blade mode and one in the three-blade mode. According to the figure, in the power generating processes using the above two modes, the power conversion of the wind turbine generator in the six-blade mode is better than that of the wind turbine generator in the three-blade mode in a low wind-speed environment. On the contrary, the power conversion of the wind turbine generator in the three-blade mode is better than that of the wind turbine generator in the six-blade mode in a high wind-speed environment.

Accordingly, as the wind speed does not exceed 3.7 m/s, the power of the intelligent wind turbine generator 1 in the six-blade mode is higher than that in the three-blade mode; as the wind speed exceeds 3.7 m/s, the power of the intelligent wind turbine generator 1 in the three-blade mode is gradually higher than that in the six-blade mode. The line representing the power generating power in the six-blade mode crosses the line in the three-blade mode at the point (wind speed=3.7 m/s, power=5.35 W).

Figure 3:
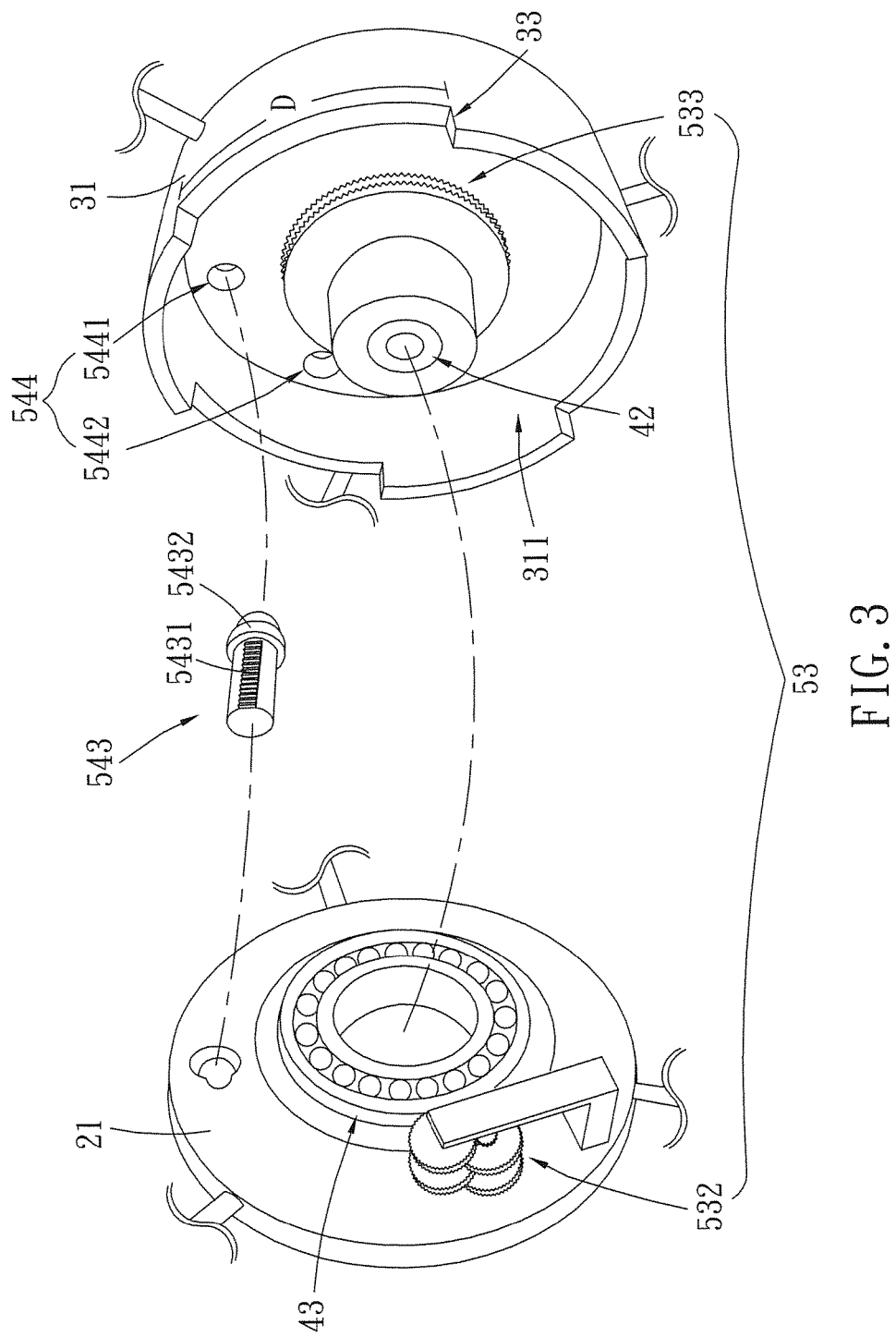
FIG. 3 shows an internal structural diagram of the intelligent wind power generator according to an embodiment of the present invention.

Please refer again to FIGS. 4 and 5. According to the present embodiment, a wind turbine generator in the six-blade mode is shown in FIG. 4 and a wind turbine generator in the three-blade mode is shown in FIG. 3. For the intelligent wind turbine generator 1 according to the present embodiment, as the wind speed exceeds 3.7 m/s, the electrical power of the power generating module 4 is greater than 5.35 W. In addition, the voltage value is proportional to the electrical power, thereby the control module 5 detects that the voltage value generated by the power generating module 4 exceeds a predetermined value 400, which is the voltage value as the power of the intelligent wind turbine generator 1 is 5.35 W. The control module 5 drives the first blade module 2 to rotate with respect to the second blade module 3. The plurality of first blades 22 overlap the plurality of second blades 32, and thus converting the intelligent wind turbine generator 1 from the six-blade mode to the three-blade mode. Contrarily, when the wind speed is reduced less than 3.7 m/s, the power of the power generating module 4 is lower than 5.35 W. The control module 5 detects that the voltage value generated by the power generating module 4 is smaller than a predetermined value 400, and drives the first blade module 2 to rotate with respect to the second blade module 3. The plurality of first blades 22 do not overlap the plurality of second blades 32, and thus converting the intelligent wind turbine generator 1 from the three-blade mode to the six-blade mode.

The present embodiment improves the drawbacks in the prior art. The wind turbine generator according to the prior art cannot attain optimum energy conversion efficiency in both the high and low wind-speed conditions. This is because the blade number in the wind turbine generator according to the prior art is fixed. If the blade number in the wind turbine generator is greater, it can attain optimum energy conversion efficiency in the low wind-speed environment only. On the other hand, if the blade number in the wind turbine generator is fewer, it can attain optimum energy conversion efficiency in the high wind-speed environment only. The blade number in the intelligent wind turbine generator 1 according to the present embodiment is variable. The control module 5 is used for judging the voltage value generated by the power generating module 4 and hence estimating the wind condition of the environment in which the intelligent wind turbine generator 1 is situated. Then the control module 5 is used for controlling overlapping of the first and second blade modules 2, 3 and thus changing the blade number of the intelligent wind turbine generator 1. Accordingly, the intelligent wind turbine generator 1 can achieve optimum energy conversion efficiency in both high and low wind-speed environments.

Figure 7:
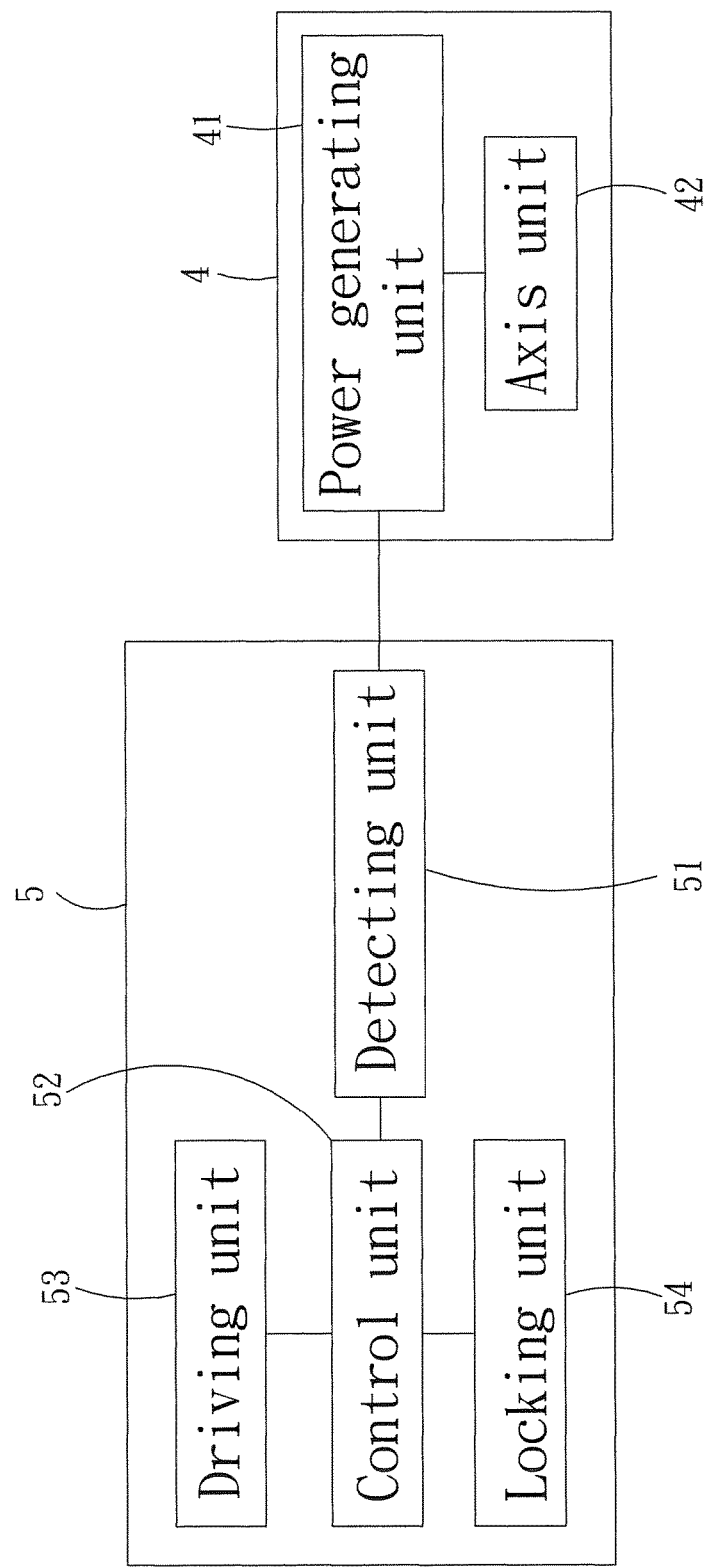
FIG. 7 shows an electrical connection diagram of the intelligent wind power generator according to an embodiment of the present invention.

In the following, the detailed structures of the power generating module 4 and the control modules according to the present embodiment are described. Please refer to FIG. 7, which shows an electrical connection diagram of the intelligent wind power generator according to the first embodiment of the present invention. As shown in the figure, according to the present embodiment, the power generating module 4 comprises a power generating unit 41 and the axis unit 42. One end of the axis unit 42 is connected with and drives the power generating unit 41. When the first and second plate members 21, 31 rotate concurrently, the axis unit 42 is driven to spin and thus driving the power generating unit 41 to generate power. On the other hand, a person having ordinary skill in the art will know the power generating module 4 of the wind turbine generator well. Hence, the details will not be described again.

According to the present embodiment, the control module 5 comprises a detecting unit 51, a control unit 52, and a driving unit 53. The control unit 52 is connected electrically with the detecting unit 51; the driving unit 53 is connected electrically with the control unit 52. The driving unit 53 is disposed between the first and second plate members 21, 31.

The detecting unit 51 is connected electrically with the power generating unit 41 and used for detecting the voltage value generated by the power generating unit 41. When the voltage value exceeds the predetermined value of 400, the control unit 52 judges and drives the driving unit 53, which then drives the plurality of first blades 22 of the first plate member 21 to overlap the plurality of second blades 32 of the second plate member 31. Contrarily, if the voltage value is lower than the predetermined value of 400, the driving unit 53 drives the plurality of first blades 22 of the first plate member 21 not to overlap the plurality of second blades 32 of the second plate member 31.

In addition, the driving unit 53 comprises a motor 531, a first gear set 532, and a second gear set 533. The motor 531 is disposed at the first plate member 21. The first gear set 532 is connected with the motor 531 and located on one side of the first plate member 21. The second gear set 533 gears into the first gear set 532 and is located one the side of the second plate member 31 facing the first plate member 21. As the first plate member 31 is embedded into the second plate member 31, the gears of the first gear set 532 gear into the gears of the second gear set 533. The motor 531 is used for driving the gears of the first gear set 532 to rotate. Then the gears of the first gear set 532 drive the gears of the second gear set 533 to rotate. Consequently, the first plate member 21 rotates with respect to the second plate member 31.

According to the present embodiment, the control unit 51 is used for controlling the motor 531 of the driving unit 53 and adjusting the number of turns of first and second gear sets 532, 533 driven by the motor 531. This means that the rotational angle of the first plate member 21 with respect to the second plate member 31 can be adjusted. The control unit 51 uses the motor 531 to control the first plate member 22 to rotate by 60 degrees with respect to the second plate member 31, which just spans the span width D of the plurality of notches 33, and thus enabling the first blade module 2 to overlap the second blade module 3. Alternatively, the first plate member 21 is rotated until the plurality of first blades 22 are against the side of the plurality of notches 33 close to the plurality of second blades 32. In this way, the first blade module 2 can overlap the second blade module 3 as well.

Please refer again to FIGS. 2 and 3. The control module 5 according to the present embodiment further comprises a locking unit 54 disposed between the first and second plate members 21, 31. The locking unit 54 comprises a motor 541, a transmission gear set 542, a locking member 543, and a plurality of locking holes 544. The motor 541 is disposed at the first plate member 21. The transmission gear set 542 is connected with the motor 541. The locking member 543 includes a gear rack 5431 on one side. The gear rack 5431 of the locking member 543 gears into the transmission gear set 542 and passes through the first plate member 21. Besides, the plurality of locking holes 544 are opposing the locking member 543 and disposed at the second plate member 31. The plurality of locking holes 544 can be divided into a first locking hole 5441 and a second locking hole 5442. The first locking hole 5441 is used for fixing the plurality of first blades 22 of the first blade module 2 and the plurality of second blades 32 of the second blade module 3 and thus enabling the plurality of first blades 22 and the plurality of second blades 32 not to overlap. On the other hand, the second locking hole 5442 is used for fixing the plurality of first blades 22 of the first blade module 2 and the plurality of second blades 32 of the second blade module 3 and thus enabling the plurality of first blades 22 and the plurality of second blades 32 to overlap. Moreover, the motor 541 is used for driving the transmission gear set 542, which drives the locking member 543 and thus embedding the locking member into one of the plurality of locking holes 544 (the first locking hole 5441 or the second locking hole 5442).

According to the present embodiment, the control unit 52 is used for controlling the locking unit 54. The control unit 52 uses the detecting unit 51 to judge the voltage value of the power generating unit 41 for confirming that the voltage value of the power generating unit 41 is either higher than or lower than the predetermined value of 400. When the voltage value is higher or lower than the predetermined value of 400, the intelligent wind turbine generator 1 starts to overlap or not to overlap the first and second blade modules 2, 3.

In the present embodiment, conversion of the six-blade mode to the three-blade mode is taken as an example. The control unit 52 first controls the motor 541 of the locking unit 54 for enabling the transmission gear set 542 to drive the locking member 542 being pulled out from the locking hole 544 (the first locking hole 5441) until a locking bump 5432 of the locking member 543 is against the first plate member 21. Then the motor 531 of the driving unit 53 continues to operate and enables the first plate member 21 to rotate 60 degrees with respect to the second plate member 31. Thereby, the plurality of first blades 22 overlap the plurality of second blades 32. Next, the motor 541 of the locking unit 54 continue to operate for enabling the transmission gear set 542 to drive the locking member 543 to be pushed into the other locking hole 544 (the second locking hole 5442) until the locking member 543 is against the hole bottom of the second locking hole 5442. Thereby, the plurality of first blades 22 overlap the plurality of second blades 32. Then the first plate member 21 is fixed to the second plate member 31 and unable to rotate with respect to each other.

To sum up, the present invention relates to an intelligent wind turbine generator, which comprises a first blade module, a second blade module, a power generating module, and a control module. The first blade module comprises a first plate member and a plurality of first blades disposed surrounding the first plate member. The second blade module comprises a second plate member and a plurality of second blades disposed surrounding the second plate member. The first plate member is inlaid in the second plate member. The power generating module is connected with the first and second blade modules. The power generating module comprises an axis unit and a power generating unit. The axis unit passes through the first and second plate members. In addition, the axis unit is connected with ad drives the power generating unit. The control module is connected electrically with the power generating module. The control module comprises a detecting unit, a control unit, and a driving unit. The detecting unit is connected electrically with the control unit. The control unit is connected electrically with the driving unit. The driving unit is disposed between the first and second plate members. The first and second blade modules rotate, driving the power generating module to generate power. The control module detects a voltage value generated by the power generating module. If the voltage value is higher or lower than a predetermined value, the control module controls the first blade module to overlap or not to overlap the second blade module. According to the present invention, automatic switching to the appropriate blade-number mode is done by detecting the voltage value generated during power generation. Thereby, the blade-number mode of the wind turbine generator can correspond to a high or low wind-speed environment and hence high-efficiency power generation can be maintained in the intelligent wind turbine generator by adopting the appropriate blade-number mode, such as the six-blade and three-blade modes.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. An intelligent wind turbine generator, comprising:
  a first blade module comprising: a first plate member and a plurality of first blades surrounding said first plate member;
  a second blade module comprises a second plate member and a plurality of second blades surrounding said second plate member, disposed at said first blade module;
  a power generating module, connected with said first blade module and said second blade module; and
  a control module, connected with said power generating module, said first blade module, and said second blade module;
  where said first blade module and said second blade module rotate to drive said power generating module to generate power; said control module detects a voltage value generated by said power generating module and judges if said voltage value is higher or lower than a predetermined value; said second plate member includes an accommodating cavity; an outer diameter of said first plate member is smaller than an inner diameter of said accommodating cavity; said first plate member is inlaid in said second plate member; and said control module controls said first blade module and said second blade module to overlap or not to overlap.

2. The intelligent wind turbine generator of claim 1, wherein said second plate member includes a plurality of notches and said plurality of first blades of said first blade module are located in said plurality of notches.

3. The intelligent wind turbine generator of claim 2, wherein said plurality of second blades of said second blade module correspond to said plurality of notches.

4. The intelligent wind turbine generator of claim 1, wherein said power generating module comprises:
  a power generating unit; and
  an axis unit, connected with said power generating unit, and passing through said first plate member and said second plate member.

5. The intelligent wind turbine generator of claim 1, wherein said control module comprises:
  a detecting unit, connected with said power generating module;
  a control unit, connected electrically with said detecting unit; and
  a driving unit, connected with said detecting unit, and disposed between said first plate member and said second plate member.

6. The intelligent wind turbine generator of claim 5, wherein said driving unit comprises:
  a motor, disposed at said first plate member;
  a first gear set, driven by said motor, and located at said first plate member; and a second gear set, geared with said first gear set, and located at said second plate member;

where said motor drives said first gear set; said first gear set drives said second gear set; and said first plate member rotates with respect to said second plate member.

7. The intelligent wind turbine generator of claim 1, wherein said control module further comprises a locking unit disposed between said first plate member and said second plate member and comprising:

a motor, disposed at said first plate member;

a transmission gear set, connected with said motor;

a locking member, connected with said transmission gear set, and passing through said first plate member; and a plurality of locking holes, disposed at said second plate member;

where said motor drives said transmission gear set; said transmission gear set drives said locking member; and said locking member is embedded in one of said plurality of locking holes.

8. The intelligent wind turbine generator of claim 7, wherein said plurality of locking holes comprise a first locking hole and a second locking hole.

\* \* \* \* \*